April 25, 1944.      F. E. WOLCOTT      2,347,588
STEAM PRESSING IRON
Filed July 27, 1940
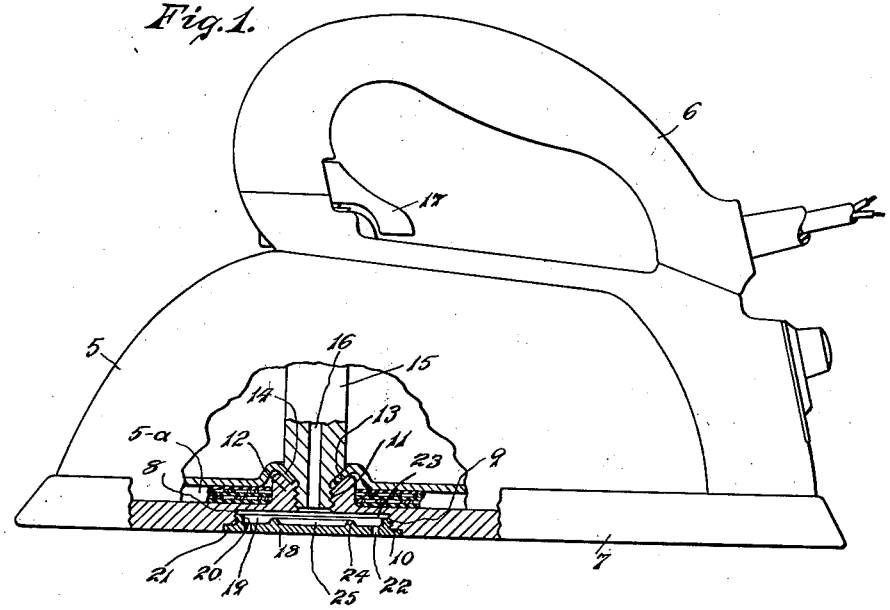
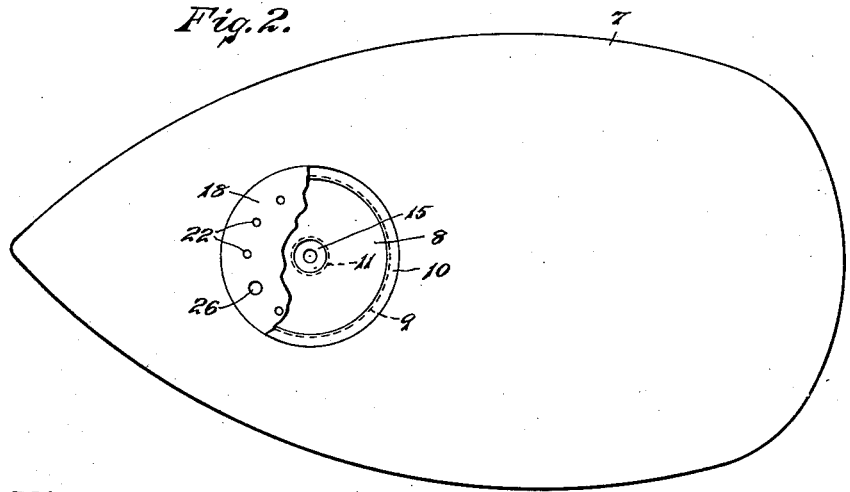
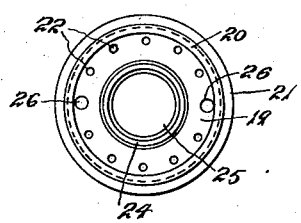
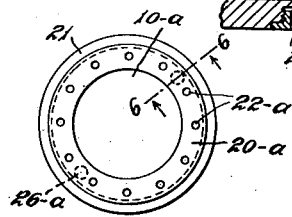
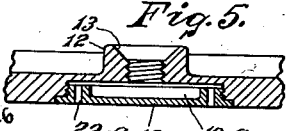
INVENTOR.
FRANK E. WOLCOTT.
BY
ATTORNEY.

Patented Apr. 25, 1944

2,347,588

UNITED STATES PATENT OFFICE 2,347,588

STEAM PRESSING IRON

Frank E. Wolcott, West Hartford, Conn., assignor to The Silex Company, Hartford, Conn., a corporation of Connecticut Application July 27, 1940, Serial No. 347,918

4 Claims. (Cl. 38—77)

This invention relates to steaming irons and more particularly to combination electric pressing and steaming irons such as shown and described in my co-pending application, Serial No. 337,279 filed May 25, 1940, (Pat. No. 2,309,427, issued Jan. 26, 1943).

It is well recognized that, in devices of this kind, there is a great deal of difficulty experienced due to the fact that the steam passages therein often become clogged by deposits from the water from which the steam is generated therein; such clogging usually taking place in the steam passages and at the orifices forming the jets from which steam is ejected from the iron. This difficulty is particularly serious in regions where hard water is used, or where the water contains alkali or other foreign matter which has a tendency to form a deposit on the walls of the steam passages and, eventually, to such an extent as to prevent the passage of steam therethrough.

Such steam irons usually contain a steam distributing chamber communicating with the steam jets and which is very susceptible to an accumulation of sediment therein that tends to clog the chamber as well as the jet openings. In steam irons such as heretofore known, no provision has been made for quickly and easily disassembling certain parts thereof to render these steam passages, and the steam distributing chamber which are most susceptible to accumulation of sediment, accessible for cleaning.

An object of this invention therefore, is to provide for a steam iron having a steam distributing chamber and jets communicating therewith, a readily detachable member to provide for accessibility in cleaning the said steam chamber and jets, as well as the steam passages in said iron.

A further object of this invention is to provide a steam iron having a steam distributing chamber in the sole plate thereof which is formed by means of a cover that can be easily detached to permit cleaning of the same chamber.

A further object of the invention is to provide such a steam distributing chamber and a cover over said chamber with jets therein that is removable to permit cleaning of the jets and steam chamber as well as to provide accessibility to the steam passage so that it may be readily cleaned of any accumulation of sediment.

Further objects of the invention will be more clearly understood from the following description and the accompanying drawing in which:

Fig. 1 is a side view of a steam iron such as described in my above stated co-pending application, with parts thereof broken away in central vertical section to illustrate the elements of the invention.

Fig. 2 is a bottom view of the sole plate of said iron showing a portion of the steam distributing chamber cover broken away.

Fig. 3 is a plan view of the said cover.

Fig. 4 is a similar view showing a cover of a modified form.

Fig. 5 is a fragmentary view in central vertical section of a portion of the sole plate with said modified form of cover.

Fig. 6 is a view of a portion of said cover in central vertical section on line 6—6 of Fig. 4.

As illustrated in the drawing, the numeral 5 denotes the casing of a steam iron which has a sole plate 7, both of which are heated by an electric heating element 5-a and a handle 6 is attached to said casing, all of which are described in detail in the aforesaid co-pending application.

This invention provides a steam distributing chamber in the form of a recess 8, in the bottom of the sole plate, having a threaded wall 9 that is surrounded by a shoulder 10. The said recess communicates with a threaded opening 11 in an upstanding boss 12, on the upper surface of the sole plate, which has a tapered seat 13 to receive a cooperating portion 14 in the bottom of the casing 5 which forms the bottom of a water chamber in said iron. The said portion is tapered in the upper surface thereof to receive a tapered shoulder on the member 15 which has a steam passage 16 therein leading to a valve that is operated by the handle 17. The said recess 8 is provided with a cover 18, in the form of a detachable screw plug having a recess 19 in the upper surface thereof, a threaded wall 20 to engage the thread on the wall 9, and a flange 21 fits within the recess 10. Steam jets, in the form of orifices 22, are provided to communicate with the steam distributing chamber 23 which is formed in said sole plate when the said cover is attached thereto. The bottom of the recess 10 in said cover is provided with an angular upstanding wall 24 which forms a drip recess 25 therein for retaining any condensate that may drip from the passage 16 until it has been evaporated into steam; the said recess also acting to retain sediment therein and retard its accumulation in the jets 22.

The said cover 18 may be provided with apertures 26, oppositely located therein, to receive a spanner wrench for turning the said cover when it is to be attached or detached from the recess in the bottom of the sole plate. The said apertures may extend through the cover and serve as additional steam jets or, if preferred, they may be made to bottom in said cover so as to prevent communication with the steam distributing chamber.

As shown in Figures 5 and 6, the said cover may be provided with a substantially thick wall 20-a to contain the steam jets 22-a therethrough and bottomed recess 26-a therein which will thus permit the use of a larger spanner wrench recess than can be practically used as steam jets; thus rendering it possible to provide additional strength to the wrench for turning said cover. In the said modified form of cover, it will be noted that the inlet from the steam distributing chamber into the jet openings 26-a is on a plate below the bottom of the recess 10-a so that the said recess may serve to retain any condensate that may be admitted into the steam distributing chamber and also to provide a trap for sediment which will permit longer periods of use of the steam iron before requiring cleaning of the sediment from the steam distributing chamber.

In the construction shown, the flange 21 on the cover 18 is preferred in order to provide a positive stop for the cover so that the same may be accurately positioned with relation to the bottom of the sole plate so as to assure a practically unbroken ironing surface thereon.

In the operation of my invention, any drip of condensate from the passage 16 will be caught in the recess 25 and retained therein until the heat in the sole plate, and consequently in said cover, will re-evaporate the said condensate so that only steam will pass out through the jets 22. The said recess 25 will also retain a certain amount of sediment therein and thereby retard its reaching the jets 22.

In the form illustrated in Figs. 4 to 6 the said condensate will be retained in the recess 10-a and re-evaporated therein so that only the steam will reach the top of the wall 20-a and the jets 22-a.

When it is desired to remove any sediment that may have accumulated in the steam passage, the said cover 18 may be quickly detached from the bottom of the wall plate, by the use of a suitable spanner wrench as above mentioned, and the bottoms of the recess, as well as the openings 10 and 25 and the jets 22, may be cleaned of any sediment that may have accumulated therein.

Removal of the cover of the recess 23 will also permit easy access to the passage 16 so that sediment therefrom may be also removed.

I claim:

1. In a steam iron, a sole plate having a lower pressing surface and a downwardly opening recess, a duct for the supply of steam to said recess, and a removable plug in said recess forming a distributing chamber therein; said plug having an upstanding annular wall, apertures extending generally vertically through said wall to conduct steam from said chamber to said pressing surface, a well in said plug located directly below the said duct for retaining condensate and/or sediment from said steam, and means for heating said iron.

2. In a steam iron, a sole plate having a lower ironing surface with a downwardly opening recess, a closure for said recess, and means to supply steam to said recess, the said closure comprising a disc-shaped member having an upstanding annular wall providing a well in said closure and passages extending generally vertically through said wall to conduct steam from said chamber to said pressing surface, and means for heating said iron.

3. A steam iron comprising a sole plate having a downwardly opening distributing chamber therein and a closure for said distributing chamber; the said closure comprising a disc-shaped member having an upstanding annular wall providing a central recess therein; said wall having openings therethrough to provide steam jets communicating with said distributing chamber at a point above the bottom of said recess, and bottomed recesses extending into said wall through the exterior face of said closure for receiving a tool for turning said closure.

4. In a steam iron, a sole plate having a lower pressing face and a downwardly opening recess, said recess having therein a removable plug having a lower pressing surface in the plane of the pressing face of the sole plate, a vaporizing well on said plug, having an open top and an annular side wall, means to supply moisture to said well, heating means operatively associated with said sole plate and said well, steam exhaust orifices passing thru the pressing surface of said plug, the upper end of said wall being spaced below the inner face of the recess to form a steam duct, and passage means to conduct steam from said duct to said orifices.

FRANK E. WOLCOTT.